United States Patent
Smith et al.

(10) Patent No.: US 7,769,018 B2
(45) Date of Patent: Aug. 3, 2010

(54) ESTABLISHING TWO OR MORE SIMULTANEOUS CHANNELS OF COMMUNICATION WITH A USER

(75) Inventors: Barton A. Smith, Campbell, CA (US); Min Yin, Sunnyvale, CA (US); Shumin Zhai, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 754 days.

(21) Appl. No.: 11/456,710

(22) Filed: Jul. 11, 2006

(65) Prior Publication Data

US 2008/0013570 A1 Jan. 17, 2008

(51) Int. Cl.
H04L 12/12 (2006.01)
(52) U.S. Cl. ............... 370/395.2; 370/225; 370/227; 370/242; 709/238; 709/239
(58) Field of Classification Search .............. 370/230, 370/230.1, 232, 235, 236, 237, 352–356, 370/395.2, 395.21, 395.41, 395.5, 395.52, 370/468, 477; 709/238, 240, 242
See application file for complete search history.

(56) References Cited

U.S. PATENT DOCUMENTS

| | | | | |
|---|---|---|---|---|
| 5,182,744 A | * | 1/1993 | Askew et al. | 370/228 |
| 5,764,736 A | | 6/1998 | Schachar et al. | |
| 6,094,687 A | * | 7/2000 | Drake et al. | 709/241 |
| 6,331,986 B1 | * | 12/2001 | Mitra et al. | 370/468 |
| 6,496,480 B1 | * | 12/2002 | Ash et al. | 370/238.1 |
| 6,563,793 B1 | * | 5/2003 | Golden et al. | 370/236 |
| 6,590,867 B1 | * | 7/2003 | Ash et al. | 370/236 |
| 6,594,246 B1 | * | 7/2003 | Jorgensen | 370/338 |
| 6,636,487 B1 | * | 10/2003 | Roy | 370/260 |
| 2003/0016657 A1 | | 1/2003 | Creamer et al. | |

FOREIGN PATENT DOCUMENTS

WO  WO 2005/027460  3/2005

* cited by examiner

*Primary Examiner*—Donald L Mills
(74) *Attorney, Agent, or Firm*—Gibb I.P. Law Firm, LLC

(57) ABSTRACT

One embodiment presented herein comprises a method of establishing at least two simultaneous forms of communication between at least two entities. The method can use a service to facilitate the communication or the entities can establish communications on their own (or one entity could be establishing multiple forms of communication with a service). One embodiment begins by connecting one of the entities to a service. The service is then used to establish an initial communication form between the entities. Alternatively, if a service is not used, the entities can establish the initial communication themselves. Next, a list of alternative communication forms that are possible between the entities is created. This list can be prioritized according to a number of different parameters. This list can be created using a previously established database maintained by the service or can be created by the entities themselves as they communicate over the initial communication channel. The alternative communication forms are tested (potentially in priority order) by the service and/or the entities. After or during the testing, the method establishes at least one additional communication form between the entities from the alternative communication forms that passed the testing, such that the entities simultaneously communicate over the initial communication form and the additional communication form.

20 Claims, 2 Drawing Sheets

ESTABLISHING TWO OR MORE SIMULTANEOUS CHANNELS OF COMMUNICATION WITH A USER

BACKGROUND OF THE INVENTION

1. Field of the Invention

The invention generally relates to establishing communications between entities and more particularly to establishing at least two simultaneous forms of communication between at least two entities.

2. Description of the Related Art

Some channels (phone, internet) and modes (text, voice, audio, video) of communications are better suited to the transfer of particular types of information or for use under certain conditions than others. For example, one might be talking on the phone with another who wants to give the URL of a website. It would be more convenient to receive that URL as a text string on a screen rather than by the voice mode on the phone channel. Situations like this arise when the source of the information is an automated system as well as when it comes from a person. An automated method of establishing multiple channels of communication, that may use various modes of information transfer as appropriate to the situation between two (or more) people or between a service and a person or people would be valuable.

SUMMARY OF THE INVENTION

One embodiment presented herein comprises a method of establishing at least two simultaneous forms of communication between at least two entities. The method can use a service to facilitate the communication or the entities can establish communications on their own (or one entity could establish multiple forms of communication with a service).

Thus, one embodiment begins by connecting one of the entities to a service. The service is then used to establish an initial communication form between the entities. Alternatively, if a service is not used, the entities can establish the initial communication themselves. Next, a list of alternative communication forms that are possible between the entities is created. This list can be prioritized according to a number of different parameters. This list can be created using a previously established database maintained by the service or can be created by the entities themselves as they communicate over the initial communication channel. The alternative communication forms are tested (potentially in priority order) by the service and/or the entities. After or during the testing, the method establishes at least one additional communication form between the entities from the alternative communication forms that passed the testing, such that the entities simultaneously communicate over the initial communication form and the additional communication form. All such actions can be performed automatically or manually.

Alternatives herein can provide the entities with at least one option for choosing among the alternative communication forms. The entities can comprise peer users, computer systems, computerized services, and/or software applications. The alternative communication forms differ from each other and from the initial communication form according to many different aspects including, but not limited to channel, frequency, format type, data type, mode type, speed, bandwidth, and transmission medium. Further, the initial communication form and the additional communication form can communicate over two different, potentially non-compatible devices.

These, and other, aspects and objects of the present invention will be better appreciated and understood when considered in conjunction with the following description and the accompanying drawings. It should be understood, however, that the following description, while indicating embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description with reference to the drawings, in which.

DETAILED DESCRIPTION OF EMBODIMENTS OF THE INVENTION

Figure 1:
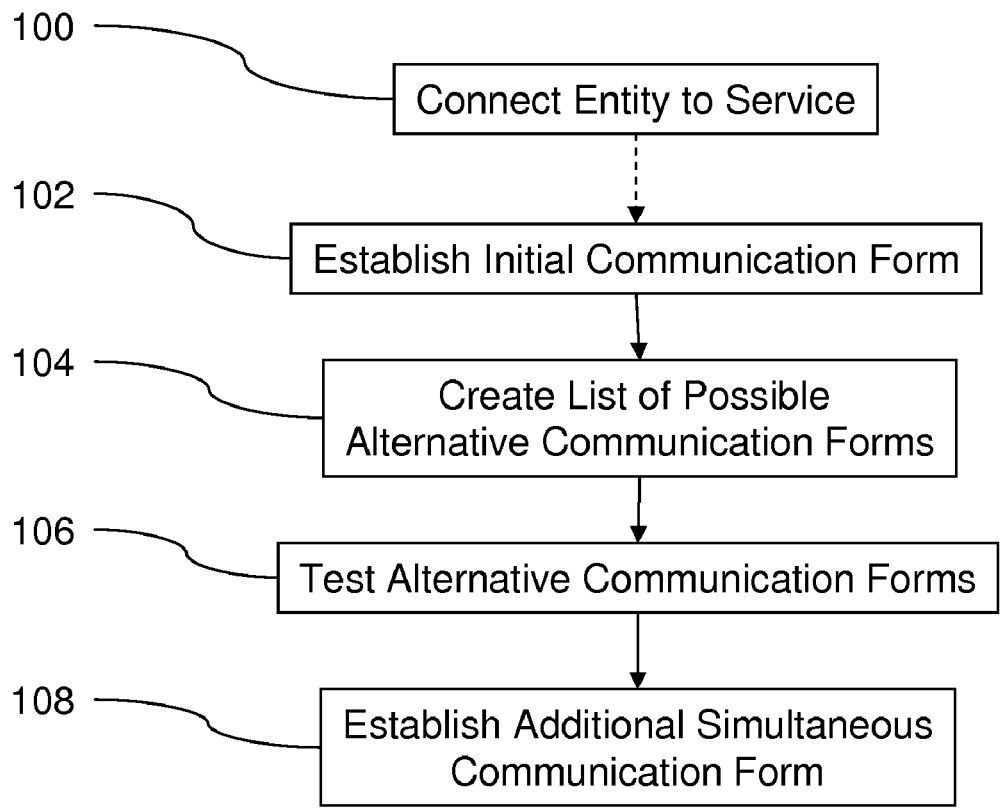
FIG. 1 is a flow diagram illustrating a method embodiment of the invention.

The present invention and the various features and advantageous details thereof are explained more fully with reference to the nonlimiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention. The examples used herein are intended merely to facilitate an understanding of ways in which the invention may be practiced and to further enable those of skill in the art to practice the invention. Accordingly, the examples should not be construed as limiting the scope of the invention.

As mentioned above, an automated method of establishing multiple channels of communication, that may use various modes of information transfer as appropriate to the situation between two (or more) people or between a service and a person or people would be valuable. When one channel of communication is established from a person to another, or to a service, additional channels that may support additional modes of communication can be established between them by knowledge of the identity of the person or persons and the existence of a directory that links that identity to phone numbers, log-on user IDs, etc. that can be used to simultaneously initiate the additional channels. The embodiments described herein accomplish this goal by establishing two or more simultaneous channels of communications, by using different devices or modes, between a computer application, service, or service provider and a user or users of the application or service. All such actions can be performed automatically or manually.

In one example, a server-based or system integration embodiment can be used over a network. In this example, the user establishes communication with the service, and the service identifies the user. The service looks up and/or creates a prioritized list of possible alternate means of contracting the user. The service then attempts to establish at least one additional channel of communication with the user by successive means from the list until successful and/or until the list has been exhausted. The service then can use combined channels of communication to provide the user with options for interaction, and to improve the efficiency and ease of interaction.

In another example, a client-based integration can be used. In this example, the user has access to two or more means of communication with a service, using one or more devices and the user establishes one initial channel (form) of communication with a service. The client application that supports that channel, or an associated application, sends information about that connection to one or more software applications or services that may be able to establish additional channels of communication. The additional applications/services attempt to establish communication with the service. If successful, they identify the user to the service if appropriate. The additional applications request relevant information from the service, or the service pushes information onto this new channel, providing the user with options for interaction.

Thus, embodiments presented herein comprise a method of establishing at least two simultaneous forms of communication between at least two entities. The method can use a service to facilitate the communication or the entities can establish communications on their own (or one entity could establish the multiple forms of communication with a service).

Figure 2:
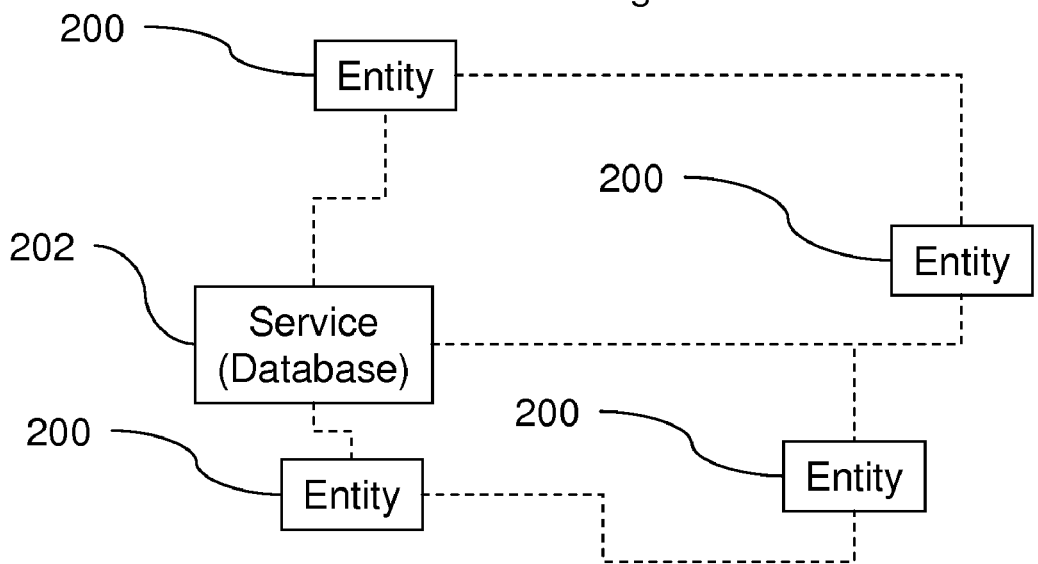
FIG. 2 is a schematic diagram of entities simultaneously communicating over multiple channels of communication.

Thus, as shown in FIGS. 1 and 2, one embodiment begins (in item 100) by connecting one of the entities 200 to a service 202 (which can maintain a database). The service 202 is then used to automatically establish an initial communication form between the entities 200 in item 102. Alternatively, if a service is not used, the entities 200 can establish the initial communication themselves in item 102 (in which case item 100 is omitted from the process).

Next, a list of alternative communication forms that are possible between the entities 200 is automatically created in item 104. This list can be prioritized according to a number of different parameters. For example, the list can be prioritized according to user preferences, according to cost, according to communication speed or bandwidth, etc. Further, the prioritization can vary by time of day, or day of the week and can be established according to current network loads and other parameters.

This list can be created in item 104 using a previously established database maintained by the service 202 or can be created by the service or entities 200 themselves as they communicate over the initial communication channel. For example, when entities 200 sign up for a service, they can provide their appropriate communications capabilities. Alternatively, while the entities and/or the service are in communication with one another, responses to queries (data queries, voice queries, etc.) between the entities and/or the service can allow the entities and/or the service to gain information as to each entities' communication capabilities.

The alternative communication forms are automatically tested in item 106 (potentially in the priority order) by the service 202 and/or the entities 200. After or during the testing, the method establishes at least one additional communication form between the entities 200 from the alternative communication forms that passed the testing in item 108. For example, the highest priority alternative communication form can be tested first and, if it passes the testing, can be immediately implemented as the additional communication form. Alternatively, all alternative communication forms can be tested before the additional communication form is chosen.

The choice of alternate communication form can be presented to the user at the time item 108 establishes the additional communication form. Thus, alternatives herein can provide the entities 200 with at least one option for choosing among the alternative communication forms. Further, all the alternative communication forms can be tested in item 106 and performance/cost measures can be established for each different communication form in item 108 to help decide which alternate communication form should be selected. This information can be gained according to the quality of the signals found during testing and/or can be provided in real time by the various communication networks that may be involved with the different communication forms. Then, in item 108, the method can automatically (or with manual user intervention) select one of the alternative communication forms that have the lowest cost, that has the highest performance, or that has other desirable characteristics. Which characteristics are most desirable can be pre-established (e.g., when the user signs up with the service or when the designer creates the service) or obtained in real time from the user. Thus, with item 108, the entities 200 simultaneously communicate over the initial communication form and the additional communication form.

The entities 200 can comprise peer users, computer systems, computerized services, and/or software applications. The alternative communication forms differ from each other and from the initial communication form according to many different aspects including, but not limited to channel, frequency, format type, data type, mode type, speed, bandwidth, and/or transmission medium, etc. Further, the initial communication form and the additional communication form can communicate over two different, potentially non-compatible devices.

In one example, a user (entity 1) can phone a service (entity 2), using wired or wireless telephone. The service can identify the user by caller ID, or ask the user to provide identifying information. The service has access to a list, by user, of Instant Messaging (IM) IDs and associated IM servers, and the service attempts to open an IM dialog with the user. If the user is logged on to the IM service, the attempt will be successful. This allows the service and user to communicate by both audio (voice response system) on the phone and by text via the IM dialog.

In another example, a user has a phone and a personal computer connected to the internet. The user calls a service using the phone. The service identifies the user by caller ID or by the user entering an account number. The phone transmits the number being called to the PC. The phone-assist application on the PC looks up the number and identifies the service being called. The service attempts to open an Instant Messaging dialog with the service. The service recognizes the user's IM screen name, and associates that IM dialog with the phone call in progress. The service and user communicate by both audio (voice response system) on the phone and by text via the IM dialog.

As on example, the GM Onstar service (General Motors Corporation, Detroit, Mich., USA) lets a user phone the service from their car. The operator at the service can see the geographical location of the car, because the location information is also transmitted over that phone channel. With the present invention, a separate communication channel could be established from the car for the operation of that service, even if the phone that the user is calling from is not one built into the car, but just a cell phone that the user has. Similarly, the additional channel of information could carry sensor data from the user, telemetry of health-related information for example. Also, information about the environment of the user (driving, noisy, in a theater, etc.) could change the priorities of what channel should be tried first.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
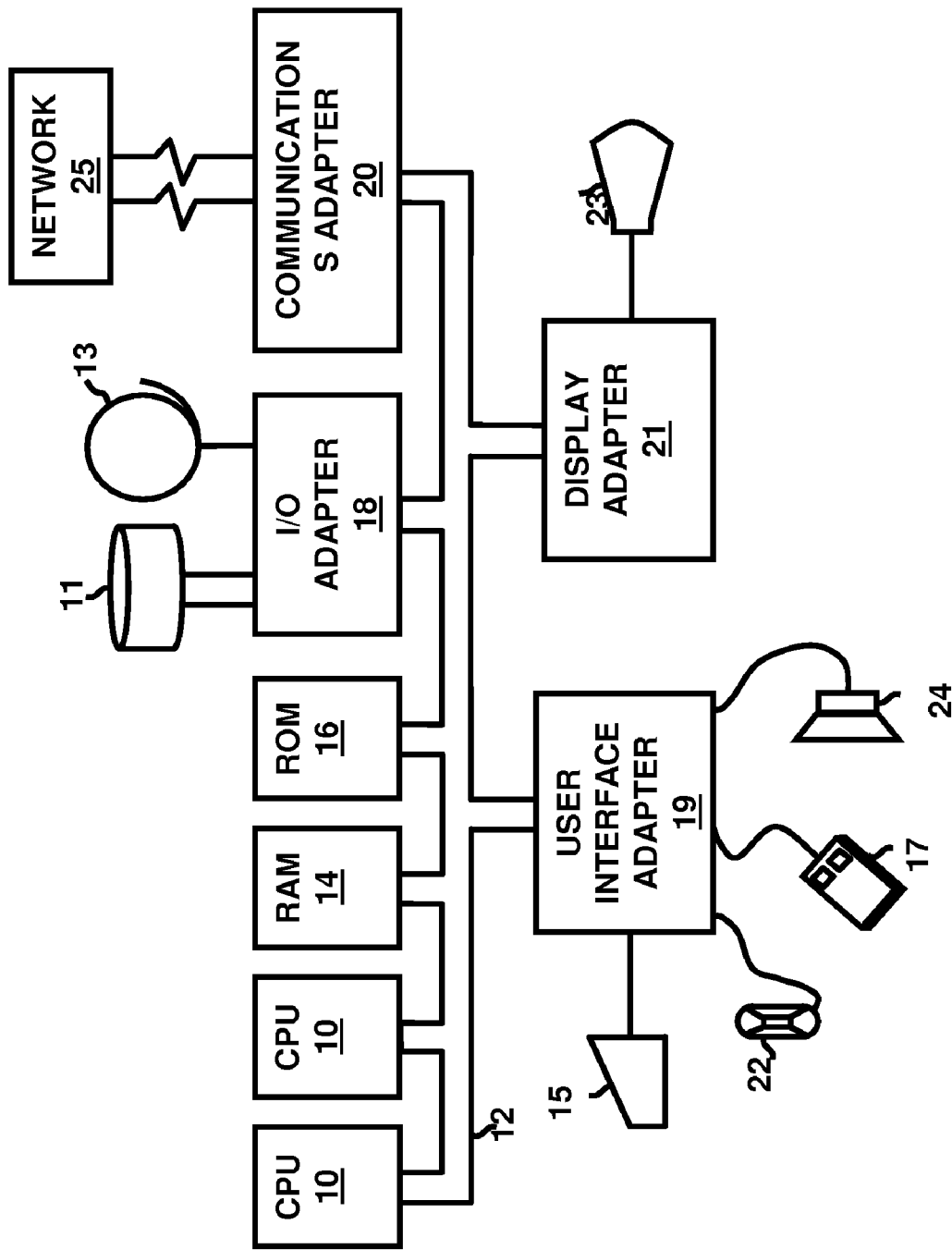
FIG. 3 is a schematic hardware diagram in which the invention can be embodied.

A representative hardware environment for practicing the embodiments of the invention is depicted in FIG. 3. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Thus, as shown above, an automated method of establishing multiple channels of communication, that may use various modes of information transfer as appropriate to the situation between two (or more) people or between a service and a person or people would be valuable. The embodiments herein establish additional channels that may support additional modes of communication using knowledge of the identity of the person or persons and their communication capabilities. The embodiments described herein accomplish this goal by establishing two or more simultaneous channels of communications, by using different devices or modes, between a computer application, service, or service provider and a user or users of the application or service.

While the invention has been described in terms of preferred embodiments, those skilled in the art will recognize that the invention can be practiced with modification within the spirit and scope of the appended claims.

What is claimed is:

1. A computer-implemented method of establishing at least two simultaneous forms of communication between at least two entities using a computer, said method comprising:
   using said computer, establishing an initial communication form between said entities based on an entity-identifier in which said initial communication form is a wholly operational and functional communication path;
   using said computer, identifying communication capabilities of said entities based on said entity-identifier;
   using said computer, creating a list of said entity-identifiers and alternative communication forms that are possible between said entities and in which each of said alternative communication forms is a wholly operational and functional communication path;
   using said computer, testing said alternative communication forms; and
   using said computer, establishing at least one additional communication form between said entities from said alternative communication forms that passed said testing, such that said entities simultaneously communicate over said initial communication form and said additional communication form.

2. The method according to claim 1, further comprising providing said entities with at least one option for choosing among said alternative communication forms.

3. The method according to claim 1, wherein said entities comprise one or more of a peer user, a computer system, a computerized service, and a software application.

4. The method according to claim 1, wherein said alternative communication forms differ from each other and from said initial communication form according to at least one of cost, frequency, format type, data type, mode type, speed, bandwidth, transmission medium, and user interaction requirement.

5. The method according to claim 1, wherein said initial communication form and said additional communication form communicate over two different devices.

6. A computer-implemented method of establishing at least two simultaneous forms of communication between at least two entities using a computer, said method comprising:
   using said computer, establishing an initial communication form between said entities based on an entity-identifier and in which said initial communication form is a wholly operational and functional communication path;
   using said computer, creating a prioritized list of said entity-identifiers alternative communication forms that are possible between said entities using a previously established database and in which said alternative communication forms is a wholly operational and functional communication path;
   using said computer, testing said alternative communication forms in priority order; and
   using said computer, establishing at least one additional communication form between said entities from said alternative communication forms that passed said testing, such that said entities simultaneously communicate over said initial communication form and said additional communication form.

7. The method according to claim 6, further comprising providing said entities with at least one option for choosing among said alternative communication forms.

8. The method according to claim 6, wherein said entities comprise one or more of a peer user, a computer system, a computerized service, and a software application.

9. The method according to claim 6, wherein said alternative communication forms differ from each other and from said initial communication form according to at least one of cost, frequency, format type, data type, mode type, speed, bandwidth, transmission medium, and user interaction requirement.

10. The method according to claim 6, wherein said initial communication form and said additional communication form communicate over two different devices.

11. A computer-implemented method of establishing at least two simultaneous forms of communication between at least two entities using a computer, said method comprising:
   using said computer, connecting one of said entities to a service;
   using said computer, identifying said entity as said entity connects to said service based on an entity-identifier;
   using said computer, using said service to establish an initial communication form between said entities based on said entity-identifier and in which said initial communication form is a wholly operational and functional communication path;
   using said computer, creating a prioritized list of entity-identifiers and alternative communication forms that are possible between said entities using a previously established database maintained by said service and in which each of said alternative communication forms is a wholly operational and functional communication path;
   using said computer, testing, by said service, said alternative communication forms in priority order; and
   using said computer, establishing at least one additional communication form between said entities from said alternative communication forms that passed said testing, such that said entities simultaneously communicate over said initial communication form and said additional communication form.

12. The method according to claim 11, further comprising providing said entities with at least one option for choosing among said alternative communication forms.

13. The method according to claim 11, wherein said entities comprise one or more of a peer user, a computer system, a computerized service, and a software application.

14. The method according to claim 11, wherein said alternative communication forms differ from each other and from said initial communication form according to at least one of cost, frequency, format type, data type, mode type, speed, bandwidth, transmission medium, and user interaction requirement.

15. The method according to claim 11, wherein said initial communication form and said additional communication form communicate over two different devices.

16. A computer storage medium comprising computer executable instructions which when executed by a computer perform a method of establishing at least two simultaneous forms of communication between at least two entities, said method comprising:
   establishing an initial communication form between said entities based on an entity-identifier and in which said initial communication form is a wholly operational and functional communication path;
   identifying communication capabilities of said entities based on said entity-identifier;
   creating a list of entity-identifiers and alternative communication forms that are possible between said entities and in which each of said alternative communication forms is a wholly operational and functional communication path;
   testing said alternative communication forms; and
   establishing at least one additional communication form between said entities from said alternative communication forms that passed said testing, such that said entities simultaneously communicate over said initial communication form and said additional communication form.

17. The computer readable medium according to claim 16, wherein said method further comprises providing said entities with at least one option for choosing among said alternative communication forms.

18. The computer readable medium according to claim 16, wherein said entities comprise one or more of a peer user, a computer system, a computerized service, and a software application.

19. The computer readable medium according to claim 16, wherein said alternative communication forms differ from each other and from said initial communication form according to at least one of cost, frequency, format type, data type, mode type, speed, bandwidth, transmission medium, and user interaction requirement.

20. The computer readable medium according to claim 16, wherein said initial communication form and said additional communication form communicate over two different devices.

* * * * *